United States Patent
Maus et al.

(10) Patent No.: US 10,054,024 B2
(45) Date of Patent: Aug. 21, 2018

(54) HONEYCOMB BODY WITH FLEXIBILITY ZONES, EXHAUST-GAS PURIFICATION UNIT AND MOTOR VEHICLE

(75) Inventors: Wolfgang Maus, Bergisch Gladbach (DE); Peter Hirth, Rösrath (DE); Rolf Brück, Bergisch Gladbach (DE); Kait Althöfer, Wiehl (DE)

(73) Assignee: EMITEC Gesellschaft fuer Emissiontechnologie mbH, Lohmar (DE)

( * ) Notice: Subject to any disclaimer, the term of this patent is extended or adjusted under 35 U.S.C. 154(b) by 907 days.

(21) Appl. No.: 12/869,860

(22) Filed: Aug. 27, 2010

(65) Prior Publication Data

US 2011/0033345 A1 Feb. 10, 2011

Related U.S. Application Data

(63) Continuation of application No. PCT/EP2009/015403, filed on Feb. 6, 2009.

(30) Foreign Application Priority Data

Feb. 27, 2008 (DE) .................. 10 2008 011 263

(51) Int. Cl.
  *F01N 3/28* (2006.01)
  *F01N 3/022* (2006.01)
(52) U.S. Cl.
  CPC .......... *F01N 3/281* (2013.01); *F01N 2260/10* (2013.01); *F01N 2330/02* (2013.01); *F01N 2330/44* (2013.01); *Y02A 50/2322* (2018.01)
(58) Field of Classification Search
  CPC ....... B01D 53/92; F01N 3/022; F01N 3/0222; F01N 3/281

USPC .......................................................... 428/116
See application file for complete search history.

(56) References Cited

U.S. PATENT DOCUMENTS

| 4,818,746 A | 4/1989 | Cyron |
| 5,382,774 A * | 1/1995 | Bruck et al. .................. 219/553 |
| 7,563,414 B2 | 7/2009 | Brück |
| 7,789,947 B2 | 9/2010 | Hodgson |
| (Continued) | | |

FOREIGN PATENT DOCUMENTS

| DE | 10 2004 058 285 A1 | 6/2006 |
| DE | 102005028044 A1 | 12/2006 |
| (Continued) | | |

OTHER PUBLICATIONS

International Search Report of PCT/EP2009/051403, dated Jun. 12, 2009.

*Primary Examiner* — Humera N Sheikh
*Assistant Examiner* — Xiaobei Wang
(74) *Attorney, Agent, or Firm* — Laurence A. Greenberg; Werner H. Stemer; Ralph E. Locher

(57) ABSTRACT

A honeycomb body includes at least one housing and a honeycomb structure with a plurality of channels. The honeycomb structure is formed from at least one at least partially structured metallic layer which forms connecting points fixing the honeycomb structure. A cross section of the honeycomb structure has radial zones with differing densities of the connecting points. In at least one zone, at least 1% and at most 20% of inner contact points in the cross section also form a connecting point. An exhaust-gas purification unit and a motor vehicle are also provided.

16 Claims, 5 Drawing Sheets

(56) References Cited

U.S. PATENT DOCUMENTS

| | | | |
|---|---|---|---|
| 8,173,268 B2 * | 5/2012 | Maus et al. | 428/593 |
| 2001/0013390 A1 * | 8/2001 | Staubwasser | 156/205 |
| 2005/0054526 A1 * | 3/2005 | Steinke et al. | 502/439 |
| 2007/0259198 A1 * | 11/2007 | Althofer et al. | 428/553 |
| 2008/0182066 A1 | 7/2008 | Voit et al. | |

FOREIGN PATENT DOCUMENTS

| | | |
|---|---|---|
| DE | 102005038572 A1 | 2/2007 |
| EP | 0 220 468 A1 | 5/1987 |
| KR | 20050084183 A | 8/2005 |
| WO | 2004050219 A1 | 6/2004 |
| WO | 2006058666 A1 | 6/2006 |

* cited by examiner

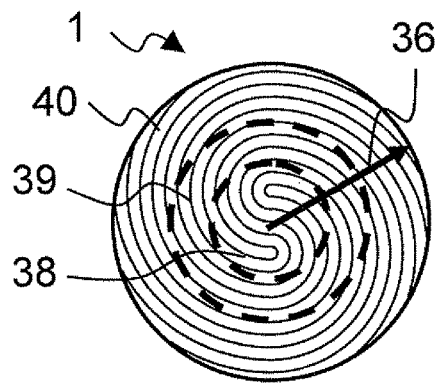
FIG. 6
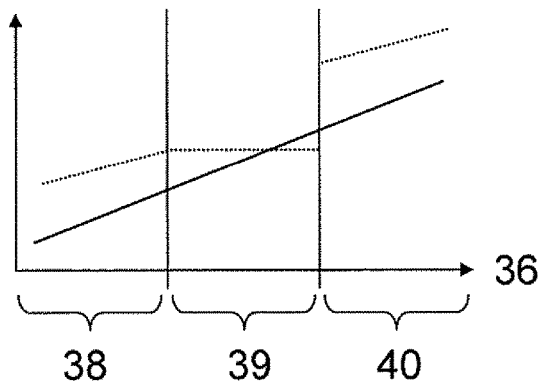
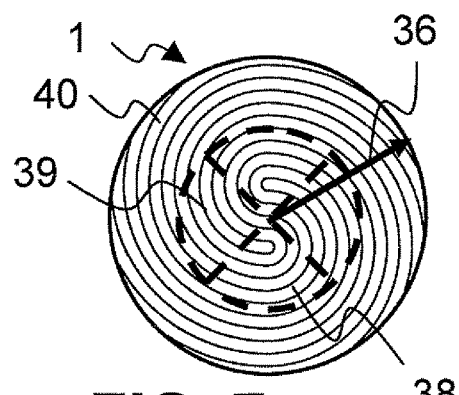
FIG. 7
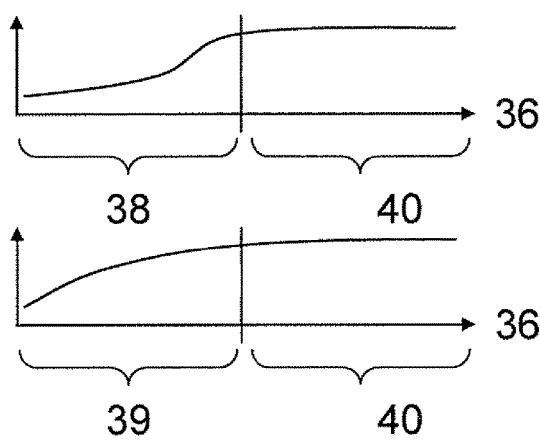
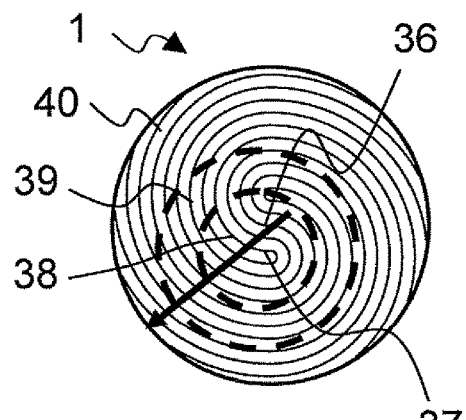
FIG. 8
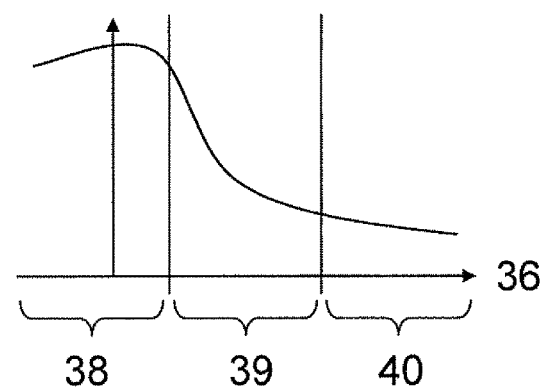

HONEYCOMB BODY WITH FLEXIBILITY ZONES, EXHAUST-GAS PURIFICATION UNIT AND MOTOR VEHICLE

CROSS-REFERENCE TO RELATED APPLICATION

This is a continuation, under 35 U.S.C. § 120, of copending International Application No. PCT/EP2009/051403, filed Feb. 6, 2009, which designated the United States; this application also claims the priority, under 35 U.S.C. § 119, of German Patent Application DE 10 2008 011 263.1, filed Feb. 27, 2008; the prior applications are herewith incorporated by reference in their entirety.

BACKGROUND OF THE INVENTION

Field of the Invention

The present invention relates to a honeycomb body such as is used, for example, for exhaust-gas aftertreatment in motor vehicles. A honeycomb body of that type has at least a housing and a honeycomb structure. The honeycomb structure in turn has a multiplicity of channels through each of which the exhaust gas can flow. The honeycomb structure is formed with at least one at least partially structured metallic layer which forms connecting points fixing the honeycomb structure. Honeycomb bodies of that type, which are distinguished by a high degree of internal flexibility, are used in particular as catalyst carrier bodies and/or particle separators in exhaust systems of diesel and/or spark ignition engines. The invention also relates to an exhaust-gas purification unit having at least one honeycomb body and a motor vehicle having at least one exhaust-gas purification unit.

In the exhaust-gas purification of internal combustion engines, honeycomb bodies have the advantage of having a particularly large surface area, in such a way that very close contact is ensured between the exhaust gas flowing through and the channel walls. The surface area, which is formed generally by the channel walls, is often coated with suitable, if appropriate different catalysts in order to enable a conversion of pollutants contained in the exhaust gas. Other applications for such honeycomb bodies include the (at least temporary) storage of solid matter (soot, particles, etc.) and/or flow treatment (mixing, etc.).

Honeycomb bodies of that type may fundamentally be produced from ceramic or metallic material. In recent years, however, the metallic catalyst carrier body has become particularly favored because it can be worked with very thin materials, for example sheet-metal foils with a thickness of less than 80 µm or even less than 30 µm. Such thicknesses provide a very large geometric surface area and a significantly reduced pressure loss of the exhaust gas flow as it flows through the honeycomb body as compared to ceramic carriers. With the low thickness of the sheet-metal foils, considerably improved light-off behavior for the catalytic coating is also observed because less material must be heated up by the exhaust gas in order to reach the light-off temperature for the catalytic converter (approximately 230° C.). A further advantage is that, in that case, a very simple connection to the rest of the exhaust system (for example a metallic exhaust pipe) is made possible, because in each case metallic materials are combined with one another.

A honeycomb structure of that type is, however, subjected to a multiplicity of different loadings over its life cycle in a mobile exhaust system. In that case, it should also be taken into consideration that specifically the superposition of the partially extreme loadings enduringly influences the durability of such honeycomb bodies. For example, the following thermal loading can enduringly influence the durability: extreme temperature peaks (up to over 1,000° C.), considerable rates of change of temperature during heating and cooling, and temperature distribution of the inflowing exhaust-gas flow. This likewise applies with regard to mechanical loading, specifically for example with regard to maximum acceleration level, frequency range of excitation with regard to the natural, characteristic or eigen frequencies, as well as the gas dynamic loading as a result of gas pulsation. It is clear that specifically the connecting regions of the individual components (sheet-metal foils, housing, etc.) of such a honeycomb body to one another are subjected to particularly high loadings, and should where possible withstand the constantly changing thermal and/or dynamic loadings for a very long time.

Connecting techniques are known in which hard solder or brazing material (as a brazing foil, brazing powder and/or brazing paste) is positioned in certain zones of a honeycomb body of that type in order to connect the metallic components to one another. Strip-shaped, encircling zones are often formed between the housing and the sheet-metal foils of the honeycomb body, wherein the zones may extend over a part of the axial length or over the entire axial length of the honeycomb body or of the housing. In order to connect the sheet-metal foils to one another, it may likewise be considered known for them to be connected to one another over the entire cross section in an axial partial region of the honeycomb body. In addition and/or alternatively thereto, it is also possible to form zones (as viewed from the end side) which encompass a multiplicity of channels in which a connection is formed. It is thus possible to generate end-side patterns, for example in the manner of concentric rings, strips, triangles and the like.

Even though a multiplicity of different proposals has already been made with regard to the structure of such a brazing pattern regarding durability, they however cannot withstand all of the presently prevailing conditions in the exhaust system of a motor vehicle. In specifying a structure for a brazing pattern of a honeycomb body of that type, it is possible to take into consideration a multiplicity of different criteria in order to obtain firstly adequate flexibility and secondly durability of the honeycomb structure. Furthermore, in producing a brazing pattern of that type, it should also be taken into consideration that the brazing connections must be realized in such a way that they can be reproduced, precisely positioned and produced by using a reliable process.

SUMMARY OF THE INVENTION

It is accordingly an object of the invention to provide a honeycomb body with flexibility zones, an exhaust-gas purification unit and a motor vehicle, which overcome the hereinafore-mentioned disadvantages of and at least partially solve the problems highlighted with regard to the heretofore-known devices of this general type. In particular, it is intended to specify a honeycomb body which has a considerably improved service life under the extreme thermal and dynamic loadings in the exhaust system of an automobile. In this case, in particular, the connecting points should be disposed relative to one another so as to provide a brazing pattern which is independent of the construction of the honeycomb structure. The honeycomb body should additionally be distinguished by considerably improved thermoshock characteristics and/or improved vibration characteristics.

With the foregoing and other objects in view there is provided, in accordance with the invention, a honeycomb body, comprising at least a housing and a honeycomb structure having a cross section within the housing and at least one at least partially structured metallic layer forming a multiplicity of channels and inner contact points within the cross section. The cross section has radial zones, at least 1% and at most 20% of the inner contact points in at least one of the radial zones form connecting points fixing the honeycomb structure and the radial zones have different densities of the connecting points.

With regard to the number of channels, it is preferable for the honeycomb body to be formed with a channel density in cells per square inch (cpsi) in a range of from 100 to 1,000, in particular from 200 to 600. It is also preferable for a plurality of smooth and structured (for example corrugated) sheet-metal foils to be used to produce the honeycomb body. Even though sheet-metal foils of that type can, for example, be coiled in spiral fashion, it is however preferable for the sheet-metal foils to have a profile differing from this, for example an S-shaped, V-shaped, W-shaped, U-shaped or similar profile. In this case, the sheet-metal foils have a thickness range of from preferably 30 μm (micrometers) to 110 μm, in particular less than 80 μm. The configuration of the sheet-metal foils relative to one another is then carried out in such a way that they ultimately uniformly fill out the (round, oval or similar) cross section of the honeycomb body. The sheet-metal foils are then connected to one another (in a force-locking and/or material-locking manner) at various positions, so-called connecting points. These preferably involve a brazed connection, in particular a high-temperature vacuum brazed connection. It is therefore also clear that the course or profile direction or brazing pattern generally relates to the finished (coiled or wound) honeycomb body. A force-locking connection is one which connects two elements together by force external to the elements, as opposed to a form-locking connection which is provided by the shapes of the elements themselves.

With regard to the connecting points, it should be noted that they serve to fix the position of sections of the at least one metallic layer, which bear against one another or are disposed adjacent one another. The layers conventionally form with one another a multiplicity of contact points, that is to say points at which sections of the same metallic layer or different metallic layers bear against one another. Specifically taking into consideration the number of channels, generally one contact point, usually two contact points, is formed per channel. With regard to the contact points, it is now proposed that, in at least one of the zones (if appropriate in the majority of the zones or even in all of the zones) at most 20% of the contact points are used for a connecting point. It is very particularly preferable for at most 10% or even as few as 1% of the inner contact points to form a connecting point. This does not include outer contact points, at which there is contact between the honeycomb structure or the metallic layer on one hand and the housing on the other hand. It is clear from this that the honeycomb structure is not of rigid construction but rather is of flexible construction in cross section in the radial direction and/or in the direction of the circumference, and can therefore permanently withstand the changing thermal loads in the exhaust system of an internal combustion engine.

It is also now proposed that the cross section be divided into radial zones with different densities of connecting points. In this case, it is to be assumed in particular that connecting points are present in all of the zones. The zones, however, likewise have connection-free regions. The boundary of such a zone may duly follow the profile of the at least one partially structured metallic layer, but it is preferable for large-area zones to be formed in cross section or over the end side independently of the profile of the metallic layer. The zones, of which two, three or four are preferably provided, may be disposed concentrically with respect to the profile and the housing and the axis of the honeycomb body, although this is not imperatively necessary. In particular, concentric zones may also be formed which have a center that is spaced apart from the axis. By providing such radial zones, it is sought to adapt the elasticity of the honeycomb structure over the radius to the vibration characteristics of the honeycomb body, for example. Consideration is given in this case in particular to the zones which adjoin the housing and the zones which are positioned close to the center or to the axis. It is preferable for the zones to differ with regard to the density of the connecting points to the greatest extent. In other words, this means, for example, that the two zones form the highest or lowest density ratio to one another. "Density" means, in particular, the value given by dividing the number of connecting points by the area of the (for example smallest) zone or of a meaningful reference area. In this case, it is fundamentally also possible for at least one (other) zone to be completely connected at all contact points and/or for at least one (other) zone to be unconnected at any contact points. In the case of, for example, a completely connected zone being provided, the zone should preferably be disposed centrally with respect to the cross section of the honeycomb structure.

In accordance with another feature of the honeycomb body of the invention, the density of the connecting points varies continuously from the inside to the outside in the direction of a radius. In other words, this means that, if one divides the cross section for example into a multiplicity of concentric rings, the density increases or decreases uniformly on average from one ring to the next. In the case that only two zones can be identified, this criterion is always met if a different density is present, because there is an (abrupt or similar) increase from the first zone to the second zone.

In accordance with a further feature of the invention, the honeycomb structure is formed with at least one stack composed of a plurality of alternating structured sheet-metal foils and smooth metallic layers, with the connecting points on a structured sheet-metal foil being positioned in an alternating fashion to adjacent metallic layers. This means, in particular, that structured sheet-metal foils and smooth sheet-metal foils (or smooth nonwovens, mats, fleeces, sintered materials, etc.) are disposed one on top of the other in an alternating fashion and thereby form a stack which is subsequently coiled and/or wound in such a way that the cross section of the honeycomb structure is produced with the desired external shape (that of the housing). Considering a single structured sheet-metal foil, this has a top side and a bottom side, with the sheet-metal foil being in contact in each case with the top side and the bottom side with "other" metallic layers. The (inner) contact points can be used to provide a connecting point. It is proposed herein that, in the direction of the structured sheet-metal foil, the connecting points are formed in an alternating fashion, that is to say one on the top side and one on the bottom side. This has the result that, due to the alternating connections, the adjacent sheet-metal foils or metallic layers can expand in the manner of an accordion, and thereby provide the internal flexibility.

In accordance with an added feature of the invention, the connecting points along a metallic layer are formed with different spacings from one another. This means, in particular, that the spacing of the connecting points is formed with equal spacing within a zone. In this respect, it is also possible to identify a step from one zone into the other zone by a corresponding change in the spacing. It is preferable in this context for the connecting points of a metallic layer to run uniformly in both courses or profile directions proceeding from the center, that is to say in particular mirror-symmetrically with respect to the center (with regard to their spacings from one another). The spacing will regularly also not change, that is to say increase or decrease, along a metallic layer constantly. In fact, the spacings in relation to adjacent connecting points differ significantly if appropriate. In special cases, it may also be the case that, with respect to a metallic layer, it is not possible to identify a uniform spacing with regard to the connecting points realized in the layer. The spacing actually to be set is determined in advance by calculation, which ultimately ensures the brazing pattern according to the invention in the finished honeycomb structure.

In accordance with an additional feature of the honeycomb body of the invention, the connecting points are brazing points which are formed adjacent extrema of the at least partially structured metallic layer. "Brazing points" means, in particular, connections which are produced by technical joining (brazing, sintering or welding) and in which hard solder or brazing material has been used. Brazing points are thus produced in particular through the use of a high-temperature vacuum brazing process. The extrema formed by the structure (for example wave peaks and wave troughs) ultimately form the inner contact points, with the brazing points adjoining the contact points. It is very particularly preferable in this case for the extrema themselves to be free from brazing material, that is to say for the brazing points to be formed at both sides as flanking brazing strips. A connecting point includes at most one brazing point of two directly adjacent extrema of one orientation (that is to say only wave peaks or only wave troughs). It is even preferable for a connecting point to have only precisely one brazing point to a single extremum.

In accordance with yet another feature of the invention, the connecting points are formed only in at least one partial section of the extent of the honeycomb structure in the direction of the axis thereof. This means, in particular, that the connecting points are formed only over a part of the channel length. The extent of the honeycomb structure is generally delimited by the end sides thereof, which end sides permit the inflow of exhaust gas into the honeycomb structure and the outflow of exhaust gas out of the honeycomb structure. It is preferable for one partial section to be provided close to the first end side and for a further partial section to be provided close to the second end side, while the rest of the extent does not have a cross section with connecting points. The partial section encompasses for example 5 to 15 mm proceeding from an end side. It has been found that a honeycomb structure of that type is subjected to positive thermoshock at the flow inlet side and negative thermoshock at the flow outlet side. This means, in particular, that the positive thermoshock generates radial compressive stresses there which, due to the distributed configuration of the brazing points, can for example be effectively compensated through the use of torsion of the sheet-metal foils. On the other hand, radial tensile stresses, for example, prevail at the outlet side, which radial tensile stresses can likewise be effectively compensated through the use of the brazing pattern proposed herein. Regardless of this, the at least one axial partial region or cross section including the connecting points may also be provided at other positions, for example in the region of the axial center of the honeycomb structure.

In accordance with yet a further feature of the honeycomb body of the invention, two partial sections are provided which are spaced apart from one another in the direction of the axis, with the connecting points overlapping in the direction of the axis. This means, in particular, that a connecting point in a first partial section is disposed congruently, as viewed in the direction of the direction of the axis or along a channel, with respect to another connecting point in the second partial section. Merely for the sake of completeness, it is pointed out that an offset configuration may also be expedient for specific applications.

In accordance with yet an added feature of the invention, a secure connection of the highly flexible honeycomb structure to the housing may be obtained in that the honeycomb structure is connected to the housing through the use of all of the metallic layers and over the entire extent of the honeycomb structure. It is very particularly preferable for all of the metallic layers to be disposed so as to bear in each case with both of their ends against the housing, and to thereby be connected to the housing, preferably through the use of a brazing connection, over the entire extent of the ends.

In accordance with yet an additional feature of the invention, in order to save brazing material for connecting the metallic layers to the housing, an encircling strip pattern could for example also be advantageous, in which the honeycomb structure is thus connected to the housing through the use of all of the metallic layers but only over a part of the entire extent of the honeycomb structure. In particular, encircling strips in the region of the end sides and/or the axial center may be advantageous, with preferably a width of 5 mm to 10 mm being proposed.

In accordance with again another feature of the invention, the at least one at least partially structured metallic layer is formed with at least one protuberance or one opening. It is very particularly preferable for the metallic layer to be formed with a multiplicity of protuberances and openings. It is also preferable for the protuberances to extend alternately toward the top side and toward the bottom side in the course or profile direction of the channels, and to form in each case one opening at the downstream side, that is to say in particular in the flow shadow thereof.

With the objects of the invention in view, there is also provided an exhaust-gas purification unit, comprising at least one honeycomb body according to the invention.

With the objects of the invention in view, there is concomitantly provided a motor vehicle, comprising at least one exhaust-gas purification unit having at least one honeycomb body according to the invention.

A honeycomb body of this type is particularly preferably used in an exhaust-gas treatment unit, in particular in that of a motor vehicle.

Other features which are considered as characteristic for the invention are set forth in the appended claims, noting that the features specified individually in the claims may be combined with one another in any desired technologically meaningful way and form further embodiments of the invention.

Although the invention is illustrated and described herein as embodied in a honeycomb body with flexibility zones, an exhaust-gas purification unit and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is a reduced, cross-sectional view of a further structural variant of a honeycomb body according to the invention with an accompanying graph;

FIG. 7 is a cross-sectional view of a further structural variant of a honeycomb body according to the invention with an accompanying graph;

FIG. 8 is a cross-sectional view of a further structural variant of a honeycomb body according to the invention with an accompanying graph.

DETAILED DESCRIPTION OF THE INVENTION

Figure 1:
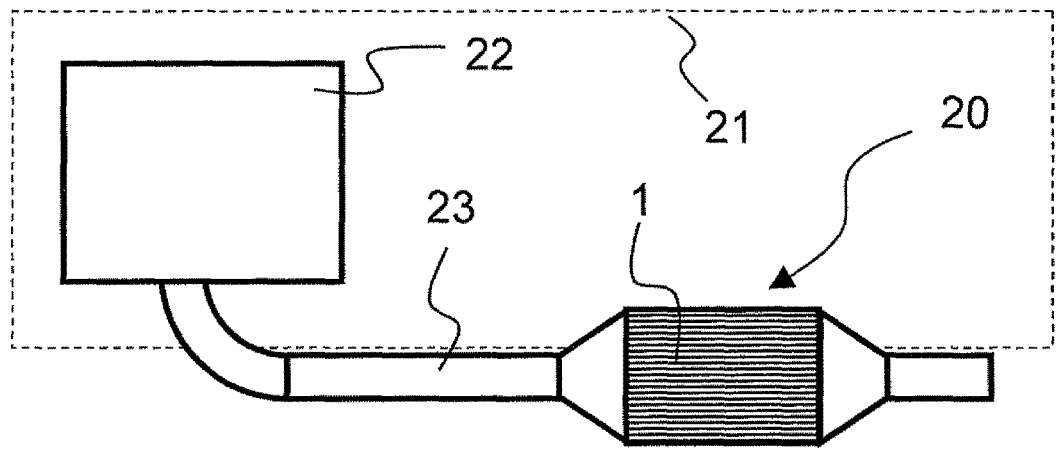
FIG. 1 is a diagrammatic, plan view of a motor vehicle having an exhaust system.

Referring now in detail to the figures of the drawings, with which the technical field as well as particularly preferred structural variants that are not intended to restrict the invention will now be explained, and first, particularly, to FIG. 1 thereof, there is seen a diagrammatically illustrated structure of a mobile exhaust system for a motor vehicle 21. The motor vehicle 21 has an internal combustion engine 22, for example a spark-ignition or diesel engine. The fuel burned therein is conducted, as exhaust gas, through a corresponding exhaust line 23 to an exhaust-gas treatment unit 20. There, the pollutants contained in the exhaust gas are at least partially converted, in such a way that ultimately only relatively non-harmful exhaust-gas constituents flow into the atmosphere. Examples of such exhaust-gas treatment units are catalytic converters, particle separators, filters, adsorbers and the like. It is clear that the number, type and/or position of such exhaust-gas treatment units 20 in an exhaust system of that type may be varied in numerous respects. The illustration herein consequently shows, merely by way of example, a possible embodiment for a honeycomb body 1 according to the invention, which is shown in the figure in the exhaust line 23.

Figure 2:
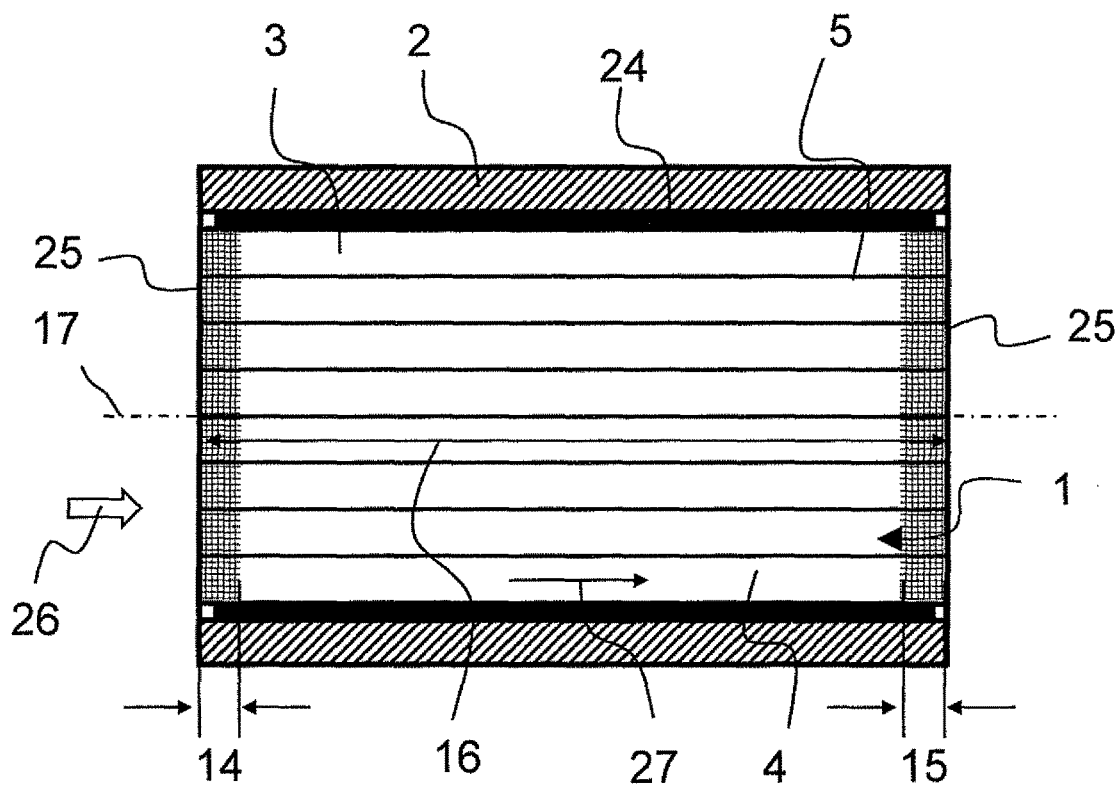
FIG. 2 is an enlarged, longitudinal-sectional view of a structural variant of a honeycomb body.

The construction of a honeycomb body 1 can be seen, for example, from FIG. 2. FIG. 2 shows a longitudinal section through a (round) honeycomb body 1 along its axis 17. The honeycomb body 1 is delimited at the outside by a housing 2 which is formed, in particular, as a metallic tube. In the interior of the housing 2, a honeycomb structure 3 is formed with a multiplicity of channels 4. The (separate, at least partially mutually detached) channels 4 extend between two end sides 25 and are disposed substantially parallel to one another. In this case, the channels 4 run substantially parallel to the axis 17. This is, however, not imperatively necessary. Additionally, the channel walls need not run rectilinearly. It is also possible for profilings (for example guide surfaces) which point in the direction of the axis 17, to be provided and/or for openings which connect adjacent channels 4 to be provided.

The channels 4 of the honeycomb structure 3 are often provided with a catalytically active coating, which may extend over an entire extent 16 of the honeycomb structure, although if appropriate may also be provided in only an axial partial section. In particular, if it is intended to obtain a high conversion rate with the catalyst and/or to prevent a laminar flow of the exhaust gas through the honeycomb structure 3, it is possible for turbulence points and/or calming zones to be provided in or with the channels 4. The turbulence points and/or calming zones result in close contact of the exhaust gas with the channel wall. A casing connection 24 is formed (preferably as a brazed connection) between the honeycomb structure 3 and the housing 2. The casing connection 24 extends substantially over the entire extent 16 of the honeycomb structure 3. This ensures, in particular, that all of the sheet-metal foils provided for constructing the honeycomb structure 3 are securely connected to the housing 2.

An axial region of the honeycomb structure, in which the cross section with connecting points is formed, is shown in each case by hatching close to the two end sides 25. It should be clarified that (even though the entire region is hatched therein), in that region, the connecting points are disposed only in a widely spread-apart fashion in each case and, if appropriate, offset with respect to one another. In this case, the connecting points at an end side 25 respectively extend over a first partial section 14 and a second partial section 15 with a maximum width of at most 15 mm, but preferably a maximum width of only 5 mm.

Figure 3:
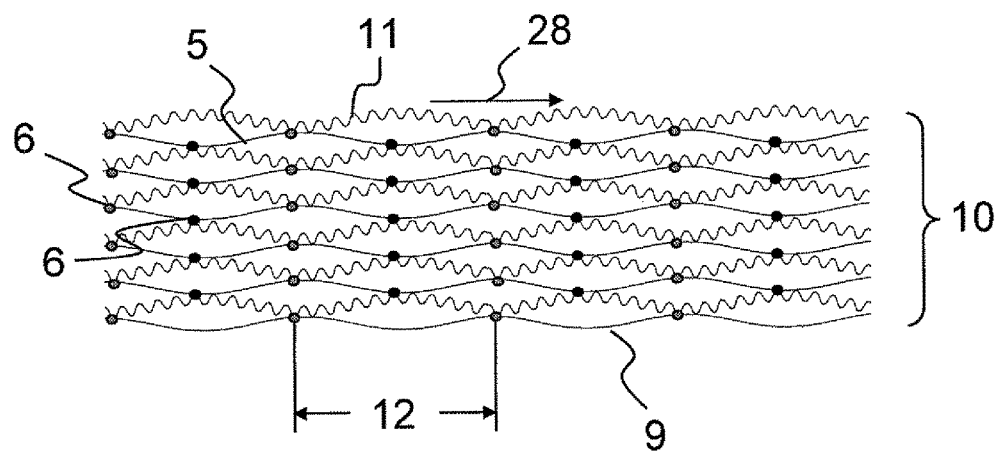
FIG. 3 is a fragmentary view of a stack for a honeycomb body according to the invention.

FIG. 3 shows a stack 10 having a multiplicity of structured sheet-metal foils 11 and smooth layers 5 (for example likewise sheet-metal foils or metallic nonwovens, fleeces or mats). In this case, the stack 10 is illustrated in a still-unwound state, that is to say it has a substantially rectilinear course or profile direction 28. Connecting points 6 of the sheet-metal foils to one another are also illustrated, with different coloring. As a result of the fact that the formation of such connecting points 6 (brazed connections) first takes place in the assembled state, that is to say in the wound state in the interior of the housing, FIG. 3 shows, in particular, the positions for an adhesive agent (for example glue or bonding agent) onto which, for example, powdered brazing material is positioned after the coiling process. The brazing material ultimately serves to generate top-side connecting points (marked herein by dark points) and bottom-side connecting points (marked herein by light points) in relation to the structured sheet-metal foil 11, which are illustrated herein by way of example and illustratively. It is shown at the bottom of FIG. 3 that the identical bottom-side connecting points, that is to say in this case the connecting points to the lower smooth layer 5, keep a specified spacing 12 in the course or profile direction 28 of, for example, at least 20 mm. In the brazing pattern of the finished honeycomb body illustrated herein, it can generally be assumed that the mutually adjacent connecting points do not have a constant spacing 12 in the course or profile direction 28 of the finished honeycomb body 1.

Figure 4:
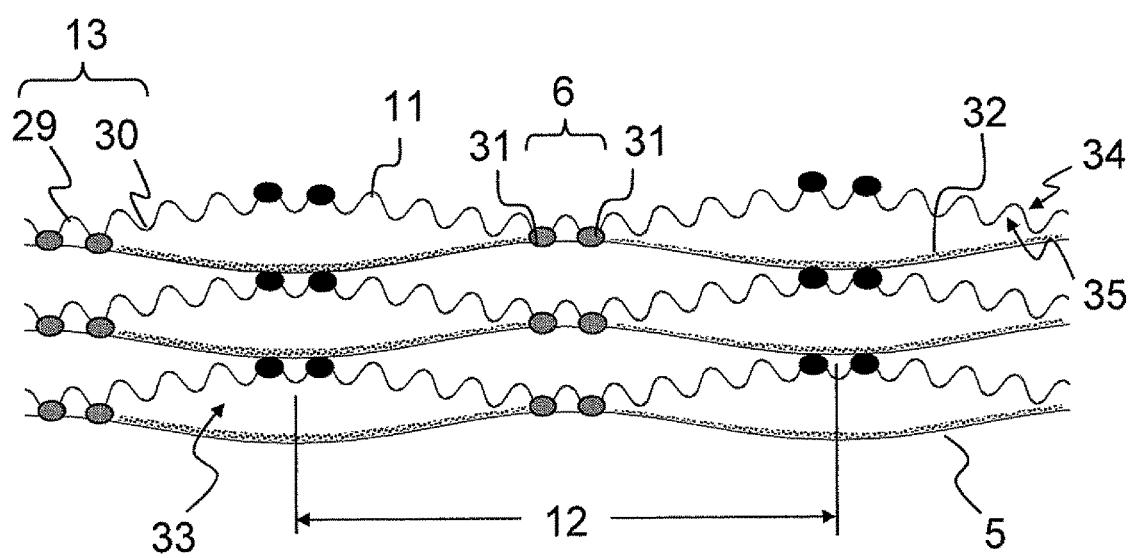
FIG. 4 is a fragmentary view of another structural variant of a stack for a honeycomb body.

FIG. 4 shows a variant in which each connecting point 6 is formed with two brazing points 31 on adjacent structure extrema 13, that is to say either an elevation (peak or crest) 29 or a depression (valley or trough) 30. A multiplicity of extrema 13 of the structure of the structured sheet-metal foil 11 is provided between the connecting points 6. It is merely pointed out at this juncture that the number of structure extrema 13 between the identical connecting points (connecting points illustrated in the same color) in the course or profile direction is normally considerably higher than that illustrated herein by way of example. In particular, at least 15 structure extrema are situated in between.

Furthermore, it can be seen from FIG. 4 that the smooth layers 5 are formed with a coating 32 for preventing the formation of undesired connections. Even though the coating 32 is preferably provided on the top side 34 and the bottom side 35 of the smooth layer 5 (in particular sheet-metal foil), the provision of an oxide layer on one side may suffice in exceptional situations. At any rate, it should be ensured in this way that a connection of the metallic layers, for example as a result of diffusion, is prevented, and relatively large cells 33 can consequently be formed under loading. In other words, it is possible to provide that a large cell 33 is formed for example with a section of a smooth layer 5 and a section of a structured sheet-metal foil 11, with the cell being delimited by two identical connecting points (shown herein for bottom-side connecting points), and furthermore with the cell boundary formed by the structured sheet-metal foil 11 being formed with at least 15 structure extrema 13. This provides a particularly high degree of deformability of the cells 33 or flexible configuration of the adjacent sheet-metal foils, specifically both in the course or profile direction 28 and also perpendicular thereto.

Figure 5:
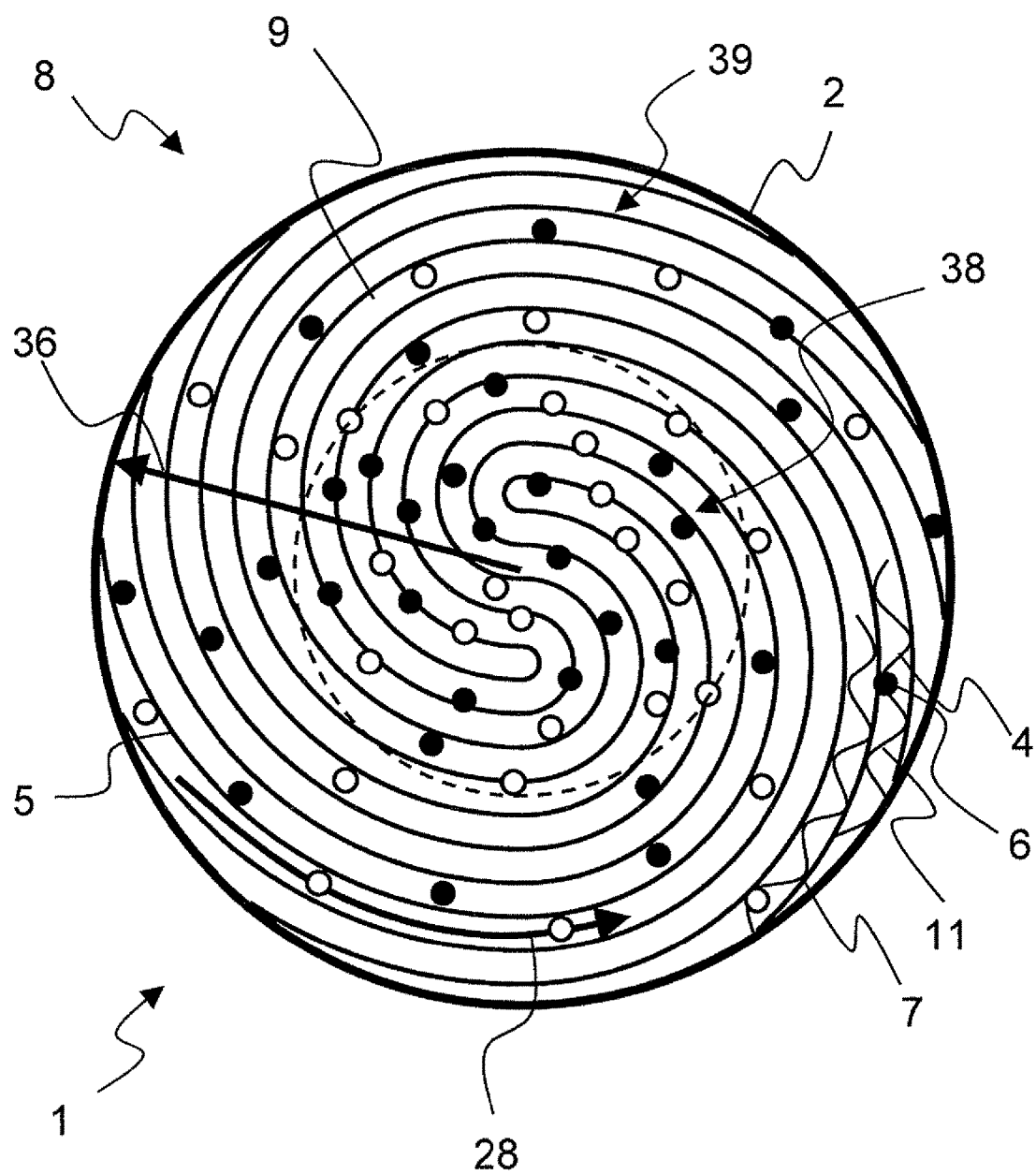
FIG. 5 is a cross-sectional view of an embodiment of a honeycomb body according to the invention.

FIG. 5 illustrates a cross section through a honeycomb body 1, for example through the first partial section 14 in FIG. 2. The connecting points 6, which are distributed over the cross section, are shown again therein. The illustration shows the housing 2 in which in this case a plurality of smooth metallic layers 5 and structured sheet-metal foils 11, wound in an S-shape, are alternately disposed, and positioned in a wound fashion, in such a way that the entire cross section 8 within the housing 2 is filled. The smooth layers 5 and structured or corrugated sheet-metal foils 11, which bear against one another, form the channels 4.

The smooth layers 5 and corrugated sheet-metal foils 11 form a multiplicity of contact points 7 with one another, that is to say points at which sections of the same metallic layer or sheet-metal foil or different metallic layers or sheet-metal foils bear against one another. More specifically, one or two contact points are formed per channel 4. Furthermore, at most 20% of the contact points 7 are provided with a connecting point 6, although it is possible for at most 10% or even only at most 1% of the inner contact points 7 within the cross section 8 of the honeycomb structure to form a connecting point 6. This does not include outer contact points, at which there is contact between the honeycomb structure 3 or the smooth layers 5 and corrugated sheet-metal foils 11 and the housing 2.

The use of the different colors of the connecting points 6 is intended to illustrate that the connecting points 6 are formed alternately toward the top side and toward the bottom side in the course or profile direction 28 of the layer 5. Therefore, the color markings (light, dark) of the connecting points 6 alternate in the course or profile direction 28. FIG. 5 also shows different zones along a radius 36, with it being possible to see a decreasing frequency of the number of connecting points 6 per illustrated zone.

FIG. 6 diagrammatically shows a further cross section of a honeycomb body 1, in a left-hand portion thereof. A first zone 38 of the cross section can be seen around the axis of the honeycomb body 1. A second zone 39 and a third zone 40 are provided concentrically with respect to the first zone 38, along the radially outward direction 36. It can be seen that the cross section is entirely formed by the first zone 38, the second zone 39, and the third zone 40. A right-hand portion of FIG. 6 shows how the frequency of the connecting points 6 varies over the radius 36 or the three zones 38, 39, 40. In this case, the diagram shows two possible exemplary embodiments. With regard to the first variant (shown in a solid line), a continuous increase of the density of the connecting points 6 is realized. In the second variant (shown in a dotted line), the frequency is initially increased slightly in the first zone 38, kept at a constant value in the second zone 39 and increased again in the third zone 40 from a changed value (in this case a considerably greater value) in relation to the second zone 39.

FIG. 7 has a layout similar to FIG. 6. In this case, the honeycomb body 1 has an outer third zone 40 which extends up to the housing and which surrounds the first zone 39 and the second zone 38. In this case, the first zone 38 and the second zone 39 are formed in each case as quarter-circle segments which are disposed alternately to one another. The segments together form a circular central region. At the right-hand side, it can be seen from the diagram that a relatively constant density value of the connecting points is provided in the outer, third zone 40. The first zone 38 and the second zone 39 have a varying profile of the density of the connecting points, in such a way that in this case, for example, the different coiling or preloading of the layers can be taken into consideration.

FIG. 8 in turn shows an exemplary embodiment in which the zones 38, 39, 40 are not disposed concentrically around the axis 17, but rather are disposed around a center 37 that is offset with respect thereto. Merely for the sake of good order, it is pointed out that the zones may self-evidently be positioned not concentrically, but rather in an overlapping or adjoining manner which differs therefrom. With regard to the diagram illustrated at the right-hand side, it can be seen that, over the radius 36, it is possible to identify firstly an increase in frequency, in particular up to the center 37, and then a decrease in frequency which extends over the second zone 39 and finally the third zone 40.

Figure 9:
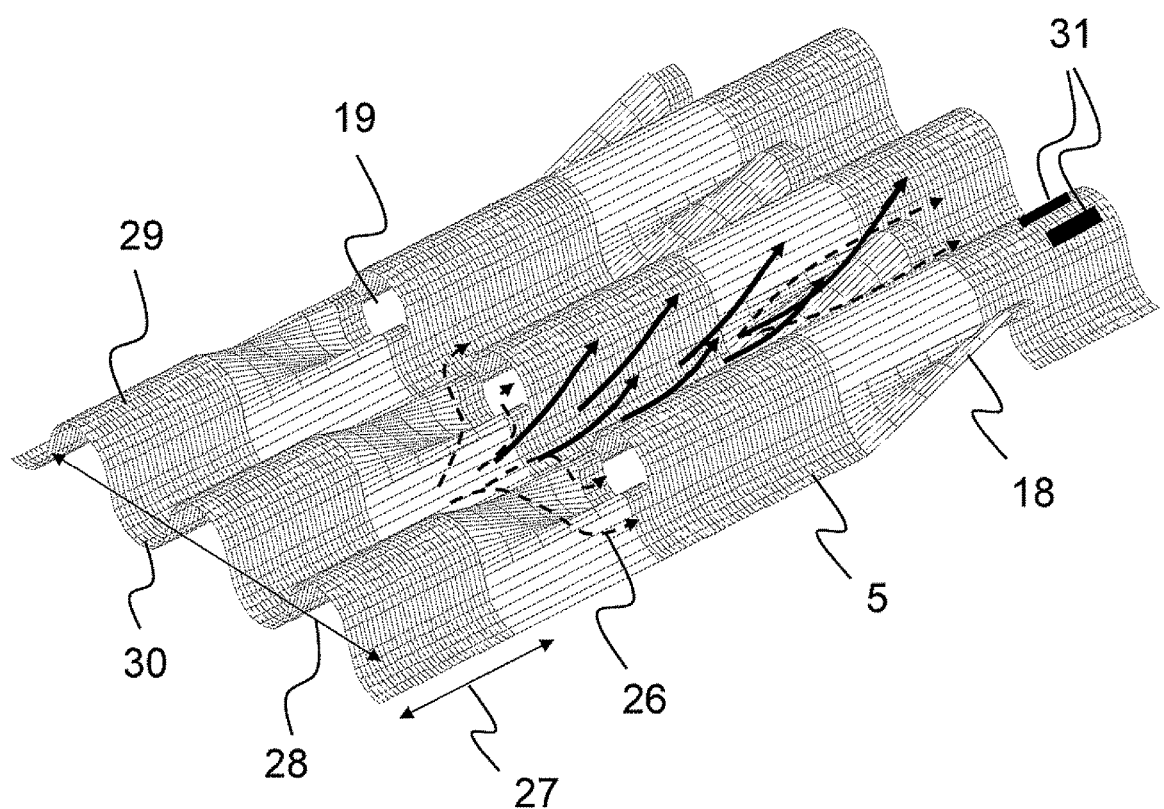
FIG. 9 is a perspective view of an example of a structured metallic layer.

FIG. 9 shows a particularly preferred structural variant of a structured layer 5, or of a structured sheet-metal foil 11, for which the invention can be put to particular use. Firstly, the complex construction of the layer 5 with a configuration of elevations 29 and depressions 30 (waveform) which repeats regularly in the course or profile direction 28, and thereby determine a direction of channel extent 27, and secondly, the integration of alternately upwardly and downwardly pointing protuberances 18, enable a repeated deflection or creation of turbulence of the exhaust gas flowing along the channels, in such a way that new flow strands can be repeatedly formed (as indicated by arrows in a first flow directions 26). As a result of the protuberances 18, openings 19, elevations 29 and depressions 30 of the at least very thin layer 5, highly rigid connections in the interior of the honeycomb body should be prevented, which is now achieved with the configuration proposed herein. For example, a connecting point 6 is shown for an elevation 29. The connecting point is composed of two brazing points 31 which are situated adjacent the apex of the elevation 29, and which are formed in this case in the manner of strips and parallel to the elevation 29. A connecting point 6 of that type can, in particular, be produced by virtue of an adhesive agent being applied (for example imprinted) in the region of the brazing points 31, the layers then being disposed so as to form the honeycomb structure, brazing powder being supplied through the channels through the end side to the adhesive agent, and the brazing material which adheres thereto ultimately forming a connecting point 6 after a thermal treatment of the honeycomb structure.

The invention claimed is:

1. A honeycomb body, comprising:
a housing; and
a honeycomb structure having a cross section within said housing, said honeycomb structure including at least one at least partially structured metallic layer forming a multiplicity of channels and inner contact points within said cross section;
said at least one at least partially structured metallic layer including at least one structured sheet-metal foil and at least one smooth metallic layer;
said cross section having a plurality of radial zones disposed concentrically around an axis longitudinally extending through said honeycomb structure;
at least 1% and at most 20% of said inner contact points in at least one of said plurality of radial zones forming connecting points connecting said at least one structured sheet-metal foil to said at least one smooth metallic layer, said connecting points fixing said honeycomb structure;
said plurality of radial zones having different non-zero densities of said connecting points; and
said connecting points being disposed at different mutual spacings along said at least partially structured metallic layer.

2. The honeycomb body according to claim 1, wherein said densities of said connecting points vary continuously along a radius from an inside to an outside of said cross section.

3. The honeycomb body according to claim 1, wherein said at least one at least partially structured metallic layer includes at least one stack of a plurality of alternating structured sheet-metal foils and smooth metallic layers forming said honeycomb structure, and said connecting points alternately connect said structured sheet-metal foils to adjacent metallic layers.

4. The honeycomb body according to claim 1, wherein said at least one at least partially structured metallic layer has extrema, and said connecting points are brazing points formed adjacent said extrema.

5. The honeycomb body according to claim 1, wherein said honeycomb structure has an axis and an extent with partial sections, and said connecting points are formed only in at least one of said partial sections in direction of said axis.

6. The honeycomb body according to claim 5, wherein said partial sections are two partial sections spaced apart from one another in the direction of said axis, and said connecting points overlap in the direction of said axis.

7. The honeycomb body according to claim 1, wherein said at least one at least partially structured metallic layer is a plurality of metallic layers, said honeycomb structure has an extent, and said honeycomb structure is connected to said housing by all of said metallic layers entirely over said extent.

8. The honeycomb body according to claim 1, wherein said at least one at least partially structured metallic layer is formed with at least one protuberance or opening.

9. An exhaust-gas purification unit, comprising at least one honeycomb body according to claim 1.

10. A motor vehicle, comprising at least one exhaust-gas purification unit having at least one honeycomb body according to claim 1.

11. The honeycomb body according to claim 1, wherein said at least one smooth metallic layer includes at least one layer that is selected from the group consisting of a sheet metal foil, a nonwoven, a mat, a fleece, and a sintered material.

12. The honeycomb body according to claim 1, wherein said cross section is entirely formed by said plurality of radial zones.

13. The honeycomb body according to claim 1, wherein the axis longitudinally extends through a center of said honeycomb structure.

14. The honeycomb body according to claim 1, wherein each one of said plurality of radial zones completely encircles the axis of said honeycomb structure.

15. The honeycomb body according to claim 1, wherein at least some of said plurality of radial zones are formed as concentric partial circle segments that together completely extend around the axis of said honeycomb structure; and wherein said concentric partial circle segments have different densities of connecting points.

16. The honeycomb body according to claim 1, wherein a density of said connecting points in one of said plurality of radial zones is increased uniformly with respect to an adjacent one of said plurality of radial zones and is decreased uniformly with respect to another adjacent one of said plurality of radial zones.

* * * * *